(12) United States Patent  
Meguro

(10) Patent No.: US 6,323,916 B1  
(45) Date of Patent: Nov. 27, 2001

(54) SERIAL DATA TRANSFER DEVICE

(75) Inventor: Takeyoshi Meguro, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/299,009

(22) Filed: Apr. 26, 1999

(30) Foreign Application Priority Data

| Apr. 28, 1998 | (JP) | 10-118429 |
| Apr. 28, 1998 | (JP) | 10-118430 |
| May 28, 1998 | (JP) | 10-147396 |
| May 28, 1998 | (JP) | 10-147397 |

(51) Int. Cl.$^7$ .................................................... H04N 9/64
(52) U.S. Cl. ........................ 348/714; 348/663; 348/718
(58) Field of Search ..................... 348/663, 664, 348/665, 666, 667, 668, 714; 375/372; 710/17; H04N 9/77, 9/78

(56) References Cited

U.S. PATENT DOCUMENTS

| 4,805,194 | * | 2/1989 | Wesolowski | 375/121 |
| 5,734,328 | * | 3/1998 | Shinbori | 340/825.06 |
| 6,029,235 | * | 2/2000 | Morgan | 711/169 |
| 6,038,683 | * | 3/2000 | Shimamura et al. | 714/11 |

* cited by examiner

*Primary Examiner*—Michael Lee  
*Assistant Examiner*—Trang U. Tran  
(74) *Attorney, Agent, or Firm*—Armstrong, Westerman, Hattori, McLeland & Naughton, LLP.

(57) ABSTRACT

A device for transferring serial data includes a first temporary memory for temporarily storing the serial data supplied from an input terminal; a first-memory for storing the data supplied from the first temporary memory; a second temporary memory for temporarily storing the serial data supplied from the input terminal; a second memory for storing the data supplied from the second temporary memory; a first transfer state detecting circuit for generating a first control signal indicative of that the serial data supplied from the input terminal is being transferred, a second transfer state detecting circuit for generating a second control signal indicative of that the serial data supplied from the input terminal is being transferred; a control circuit for deciding that the first and the second control signal have not arrived in response to the arrival of a transfer command signal, thereby transferring the data from the first temporary memory to the first memory and transferring the data from the second temporary memory 4 to the second memory. In this configuration, where the same command is issued to a plurality of circuits to be controlled, the transfer timings are made coincident to each other.

11 Claims, 3 Drawing Sheets

FIG. 1
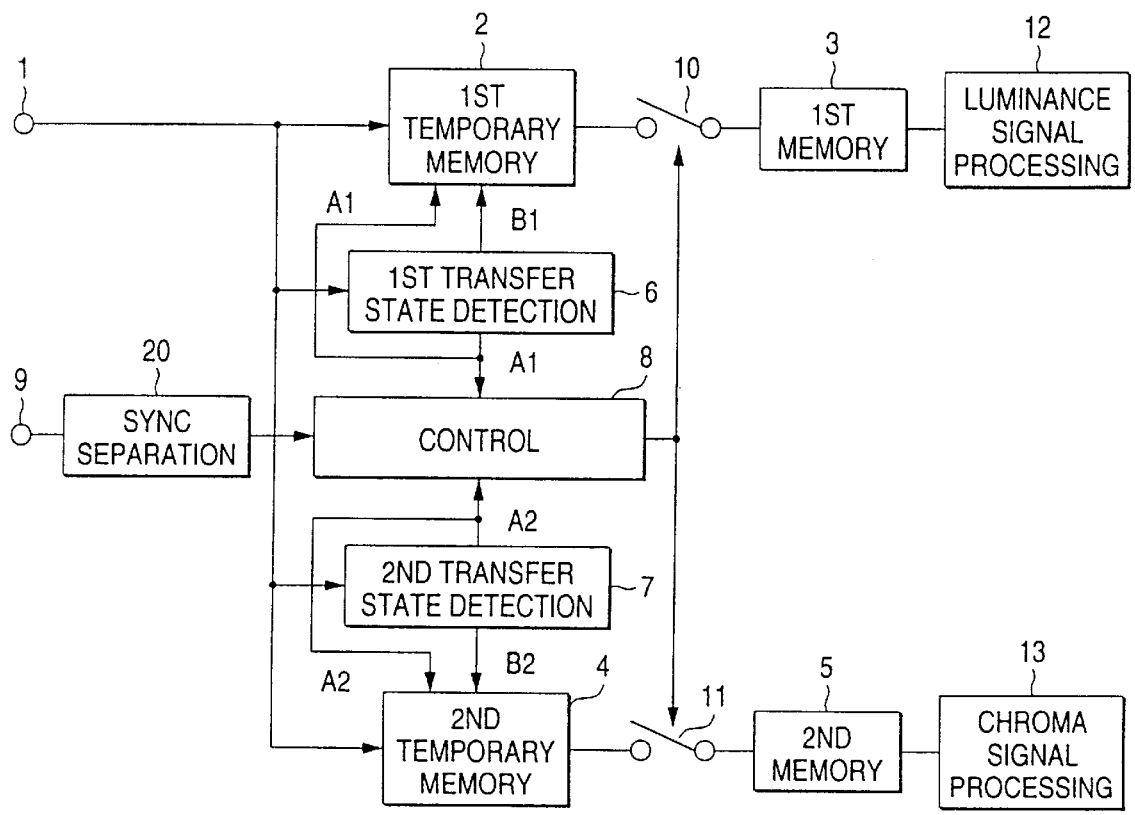
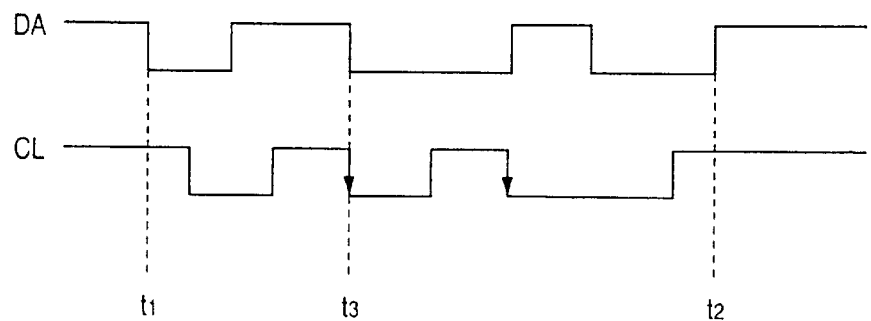
FIG. 2A DA
FIG. 2B CL

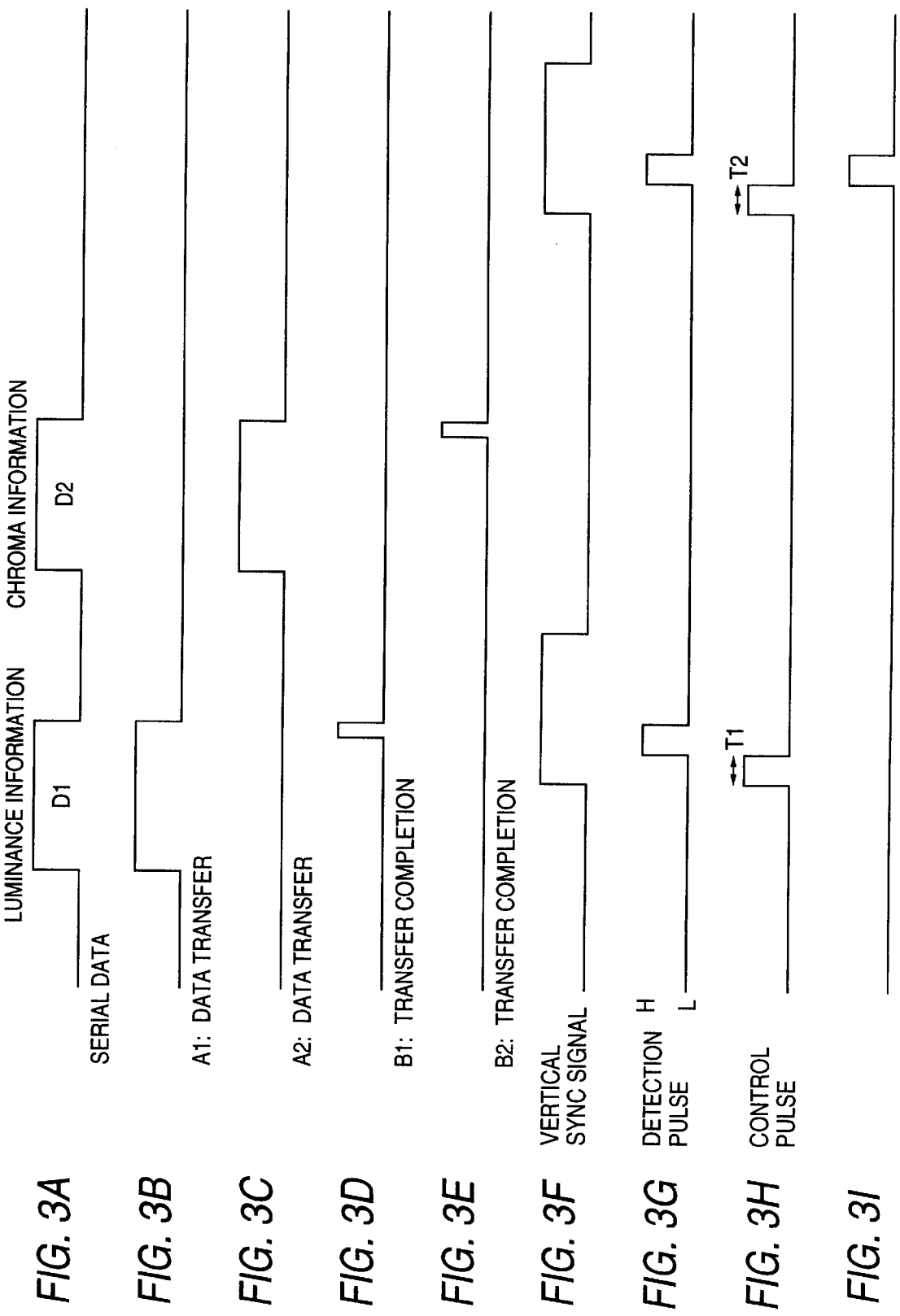

SERIAL DATA TRANSFER DEVICE

BACKGROUND OF THE INVENTION

1. Field of the Invention

The present invention relates to a serial data transfer device for serially transferring data in synchronism with clocks, and more particularly to a serial data transfer device for transferring the data at the transfer timings made coincident when the same command is simultaneously issued to a plurality of circuits to be controlled.

2. Description of the Related Art

Generally, a television receiver or home video tape recorder (VTR) incorporates a plurality of ICs. In some cases, these ICs are controlled by a single controller (microcomputer). The control system includes a serial system and a parallel system. However, in many cases, the serial system which requires a less number of lines is used. The serial system creates a start signal, slave address signal, a transfer data, stop signal, etc. in combination of logic values of "H" and "L" of the data and clock and uses a repetition signal including these plurality of signals to constitute one cycle. In this case, the transfer data carry several kinds of information.

FIGS. 2A and 2B show data and clocks in the serial data transfer device in such a serial system, respectively. Timing t1 denotes a start point and timing t2 denotes a stop point. Between these timings, necessary transfer data exist.

The start point indicates the timing when the data shifts from "H" to "L" while the clock is "H". On the other hand, the stop point indicates the timing when the data shifts from "L" to "H" while the clock is "H". The data is captured by reading the value of the data on the falling edge of the clock (e.g. t3).

Upon completion of the single data transfer, the stop signal is generated to inform the completion of the data transfer. A next start signal arrives and a next transfer data comes.

Such a serial transfer system takes a longer time where it is required that a command is simultaneously transferred to a plurality of ICs.

For example, a home video tape recorder requires for a plurality of ICs (e.g. main YC signal processing IC, head amplifier IC, and OSD IC) to be changed into a reproduction mode or a recording mode. In this case, transfer of the information for mode change in a serial manner cannot operate the plurality of ICs at the same timings.

At present, upon completion of the mode change in all the ICs, the mode is changed formally.

SUMMARY OF THE INVENTION

An object of the present invention is to provide a serial data transfer device capable of controlling the transfer timings of serial data to be coincident at a high speed and with no image disorder.

In order to attain the above object, in accordance with first aspect of the present invention, there is provided a serial data transfer device for serially transferring data comprising: an input terminal to which a serial data is inputted; a first temporary memory for temporarily storing the serial data supplied from the input terminal; a first memory for storing the data supplied from the first temporary memory; a second temporary memory for temporarily storing the serial data supplied from the input terminal; a second memory for storing the data supplied from the second temporary memory; a first transfer state detecting circuit for generating a first control signal indicative of that the serial data supplied from the input terminal is being transferred; a second transfer state detecting circuit for generating a second control signal indicative of that the serial data supplied from the input terminal is being transferred; a control circuit for deciding that the first and the second control signal have not arrived in response to the arrival of a transfer command signal, thereby transferring the data from the first temporary memory to the first memory and transferring the data from the second temporary memory to the second memory, whereby in response to the transfer command signal, the data are simultaneously transferred to the first memory and the second memory.

The second aspect of the device is a device according to the first aspect, wherein the first transfer state detecting circuit generates a first transfer completion signal indicative of that the serial data has been transferred to the first memory; the second transfer state detecting circuit generates a second transfer completion signal indicative of that the serial data has been transferred to the second memory; and in response to the arrival of the transfer command signal, the control circuit decides that the first and second control signals do not still come and the first and second transfer completion signals have come, thereby transferring the data from the first temporary memory to the first memory and transferring the data from the second temporary memory to the second memory.

The third aspect of the device is a device according to the second aspect, wherein the control circuit comprises: a system control circuit for generating a control pulse and a detection pulse delayed from the control pulse in timing in accordance with a change of the state of a transfer pulse indicative of the transfer command signal; a latch decision circuit for deciding whether or not the first and second control signal have not arrived while the control pulse is generated by the system control circuit; and a switch for passing or stopping the detection pulse in accordance with a decision output signal from the latch decision circuit.

The fourth aspect of the device is a device according to any one of the first to the third aspect, wherein said transfer command signal is a vertical synchronizing signal of a video signal.

The fifth aspect of the device is a device according to any one of the first to the third aspect, wherein said transfer command signal is an RF switch pulse signal.

The sixth aspect of the device is a device according to any one of the first to the third aspect, wherein said transfer command signal is a C-ROT pulse signal.

The seventh aspect of the device is a device according to any one of the first to the third aspect, wherein said transfer command signal is an HA switch pulse.

The eighth aspect of the device is a device according to any one of the first to the third aspect, wherein said transfer command signal is an RF switch pulse signal and a vertical synchronizing signal.

The ninth aspect of the device is a device according to any one of the first to the third aspect, wherein said transfer command signal is a horizontal synchronizing signal located in a period which does not appear on a screen.

The tenth aspect of the present invention is a serial data transfer device for serially transferring data which comprises:

an input terminal 1 to which a serial data is inputted;

a first temporary memory 2 for temporarily storing the serial data supplied from the input terminall;

a first memory 3 for storing the data supplied from the first temporary memory;

a second temporary memory 4 for temporarily storing the serial data supplied from the input terminal;

a second memory 5 for storing the data supplied from the second temporary memory;

a first transfer state detecting circuit 6 for generating a first control signal A1 indicative of that the serial data supplied from the input terminal is being transferred;

a second transfer state detecting circuit 7 for generating a second control signal A2 indicative of that the serial data supplied from the input terminal is being transferred;

a system control circuit 21 for generating a control pulse and a detection pulse delayed from the control pulse in timing in accordance with a change of the state of a transfer pulse indicative of the transfer command signal;

a latch decision circuit 23 for deciding whether or not said first and second control signal have not arrived while said control pulse is generated by the system control circuit; and a switch 22 (10,11)for passing or stopping the detection pulse in accordance with a decision output signal from the latch decision circuit, thereby transferring the data from the first temporary memory to the first memory and transferring the data from the second temporary memory to the second memory, whereby in response to the transfer command signal, the data are simultaneously transferred to said first memory and said second memory.

The eleventh aspect of the device is a device according to the tenth aspect, wherein said transfer command signal is either one of a vertical synchronizing signal of a video signal, an RF switch pulse signal, a C-ROT pulse signal and an HA switch pulse, and said switch includes a first switch and a second switch.

In accordance with the present invention, where the same command is issued to a plurality of circuits to be controlled, the timings of transfer can be made coincident to each other.

Particularly, in accordance with the present invention, the data transfer to an essential memory is not performed while the data is being transferred to the temporary memory. This permits the data to be surely transferred.

In accordance with the present invention, during the period of a vertical synchronizing signal, the data can be transmitted to a luminance signal processing block and a chroma signal processing block. Therefore, possible switching noise does not appear on a screen.

The above and other objects and features of the present invention will be more apparent from the following description taken in conjunction with the accompanying drawings.

BRIEF DESCRIPTION OF THE DRAWINGS

FIG. 1 is a block diagram of the serial data transfer device according to the present invention;

FIGS. 2A–2B are waveform chart for explaining a conventional serial data transfer device;

FIGS. 3A–3I are waveform chart for explaining a conventional serial data transfer device.

DESCRIPTION OF THE PREFERRED EMBODIMENTS

Figure 4:
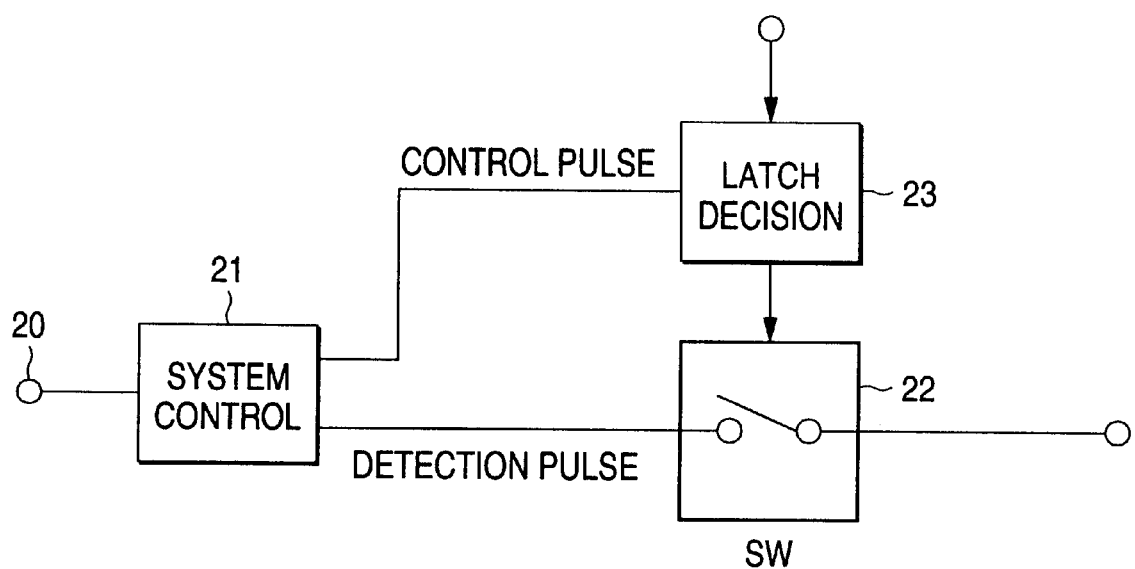
FIG. 4 is a concrete circuit diagram of the control circuit according to the present invention.

FIG. 1 shows a serial data transfer device according to the present invention. In FIG. 1, reference numeral 1 denotes an input terminal to which a serial data is inputted; 2 a first temporary memory for storing the serial data supplied from the input terminal 1; 3 a first memory for the data supplied from the first temporary memory; 4 a second temporary memory for temporarily storing the serial data supplied from the input terminal 1; 5 a second memory for storing the data supplied from the second temporary memory 4; 6 a first transfer state detecting circuit for generating a first control signal A1 indicative of that the serial data supplied from the input terminal is being transferred and a second control signal B1 indicative of that the serial data has been transferred, 7 a second transfer state detecting circuit for generating a third control signal A2 indicative of that the serial data supplied from the input terminal is being transferred and a fourth control signal B2 indicative of that the serial data has been transferred; 8 a control circuit for deciding that the first and the third control signal A1, A2 have not arrived in response to the arrival of a transfer command from a terminal 9, thereby transferring the data from the first temporary memory 2 to the first memory 3 and transferring the data from the second temporary memory 4 to the second memory 5; 10 a first switch which turns on/off in response to the output signal from the control circuit 8; 11 a second switch which turns on/off in response to the output signal from the control circuit 8; 12 a luminance signal processing block for recording/playing a video signal from a home VTR; and 13 a chroma signal processing block for recording/playing the video signal from the home VTR.

In the device shown in FIG. 1, the luminance signal processing block 12 and chroma signal processing block 13 are controlled so that their control starting timings are made coincident to each other in accordance with the serial data. For example, when the control mode is changed from the recording mode into the playing mode, it is necessary to transfer the information indicative of that the mode has been changed and the attendant information (image quality adjusting information) thereto. In this case, the serial data has a waveform as shown in FIG. 3A. Specifically, the data D2 contains the chroma information (information indicative of that the mode has been changed and image quality adjusting information) and the data D1 contains the luminance information (information indicative of that the mode has been changed and image quality adjusting information).

In operation, the serial data as shown in FIG. 3A is applied to the input terminal 1 in FIG. 1. The serial data will be serially stored in the first temporary memory 2 and second temporary memory 4. Further, the serial data is also applied to the first transfer state detecting circuit 6 and the second transfer state detecting circuit 7. In operation, the first transfer state detecting circuit 6 decodes the serial data to apply the pulse A1 (FIG. 3B), indicative of that the data D1 is being transferred, to the first temporary memory 2. Then, the first temporary memory 2 starts to store the serial data from the input terminal 1.

Further, the first transfer state detecting circuit 6 decodes the serial data to apply the pulse B1 (FIG. 3D), indicative of that the data D1 has been transferred, to the first temporary memory 2. Then, the first temporary memory 2 stops to store the serial data from the input terminal 1.

Likewise, the second transfer state detecting circuit 7 decodes the serial data to apply the pulse A2 (FIG. 3C), indicative of that the data D2 is being transferred, to the second temporary memory 4. Then, the second temporary memory 4 starts to store the serial data from the input terminal 1. The second transfer state detecting circuit 7 decodes the serial data to apply the pulse B2 (FIG. 3D), indicative of that the serial data D2 has been transferred, to the second temporary memory 4. Then, the second temporary memory 4 stops to store the serial data from the input terminal 1.

The first transfer state detecting circuit 6 and the second transfer state detecting circuit 7 can decode the coming serial data to decide to which block the data content should be transferred. Therefore, when the data D1 has come, the first temporary memory 2 operates so that the data is transferred to the luminance signal processing block 12. When the data D2 has come, the second temporary memory 4 operates so that the data is transferred to the chroma signal processing block 13.

In this way, the data D1 and D2 which have come serially are temporarily stored in the first temporary memory 2 and second temporary memory 4.

In this state, it is now assumed that a transfer command has come to the terminal 9. This transfer command serves to transfer the data from the temporary memory to the essential memory (first memory 3 and second memory 5).

The transfer command is asychronous with the data D1 and D2 in their timings. Therefore, while the data D1 and D2 which have been transferred serially are being stored in the first temporary memory 2 and second temporary memory 4, the transfer command comes.

If the data is transferred while the data are being stored in the first temporary memory and second temporary memory, the data information will be lost.

In order to overcome such an inconvenience, in accordance with the present invention, when the transfer command has come, the control circuit 8 confirms that it is not now within a data transfer period. Thereafter, the data are transferred from the temporary memory to the essential memory.

Unlike such a manner of data transfer, for example, when a vertical synchronous signal as a transfer command has come, after it is confirmed that the control circuit 8 is not within the data transfer period, the data transfer may be carried out from the temporary memory to the essential memory.

Specifically, when the mode has been changed as described above, since the switch of e.g. a transistor is switched, a DC change is likely to occur. Then, this DC change appears as noise in a video signal. In order to overcome this inconvenience, in accordance with the present invention, the data transfer is carried out in parallel, and the period of a vertical synchronizing signal which is not displayed on a screen is used as the data transfer period. As long as the period is not displayed on the screen, a horizontal synchronizing signal may be used. During the period, generated noise does not appear on the screen. Further, when an RF switch pulse, C-ROT pulse or HA switch pulse, which is a pulse signal commonly used for a video tape recorder, the control circuit confirms that it is not within the data transfer period, the data transfer from the temporary memory to the essential memory is carried out.

As one embodiment of a method of the serial data transfer according to the present invention, an explanation will be given of the method using a vertical synchronous signal.

First, as described above, the data D1 and data D2 are once stored in the first temporary memory 2 and second temporary memory 4. At this time, it is assumed that a video signal has come to the terminal 9. Then, a vertical synchronizing signal is generated from a sync separator circuit 20. This vertical synchronous signal of the video signal sets the transfer timing from the temporary memory to the essential memory.

The vertical synchronizing signal of the video signal is asynchronous with the data D1 and data D2 in timing. Therefore, while the data D1 and D2 which have been transferred serially are being stored in the first temporary memory 2 and second temporary memory 4, the vertical synchronizing signal of the video signal comes.

If the data are transferred while the data are being stored in the first temporary memory and second temporary memory, the data information will be lost.

In order to overcome such an inconvenience, in accordance with the present invention, when the vertical synchronizing signal of the video signal has come, the control circuit 8 confirms that it is not within a data transfer period. Thereafter, the data are transferred from the temporary memory to the essential memory.

More specifically, when the vertical synchronizing signal as shown in FIG. 3F is applied to the control circuit 8, it creates pulses as shown in FIGS. 3G and 3H. During the "H" level period of the pulse shown in FIG. 3H, whether or not the pulse A1 is "H" level is decided.

FIG. 4 shows a typical concrete circuit of the control circuit 8 of FIG. 1. The vertical synchronizing signal of FIG. 1 is applied to a terminal 20 in FIG. 4. In response to the vertical synchronizing signal, a system control circuit 21 generates a control pulse as shown in FIG. 3H and a detection pulse as shown in FIG. 3G. The detection pulse is transmitted or stopped when the switch 22 is turned on/off. When the detection pulse is transmitted, the memory content is transferred.

The switch 22 is turned on/off by a latch decision circuit 23. The latch decision circuit 23 decides if the pulse A1 as shown in FIG. 3B and the pulse A2 as shown in FIG. 3C are "H" level or "L" level during the period while the control pulse as shown in FIG. 3H is "H" level.

Now, if the control circuit 8 is now within the "H" level period T1 of the pulse as shown in FIG. 3H, the pulse A1 is "H" level so that the data transfer cannot be carried out. Therefore, the latch decision circuit 23 generates the control signal for turning off the switch 22. Thus, the detection pulse is not transmitted.

Therefore, in accordance with the control signal from the control circuit 8, the switches 10 and 11 are opened or turned off. When the switches 10 and 11 open as shown, the data will not be transferred from the temporary memories to the essential memories.

When the vertical synchronizing signal at a next timing is applied to the control circuit 8, it creates the control pulse (period T2) as shown in FIG. 3H and the corresponding detection pulse as shown in FIG. 3G. During the "H" level period of the pulse (period T2) shown in FIG. 3H, whether or not the pulse A1 (FIG. 3B) and pulse A2 (FIG. 3C) are "H" level is decided.

In this case, since the pulse A1 (FIG. 3B) and pulse A2 (FIG. 3C) are "L" level, apparently, the control circuit is not within the transfer period. Thus, the switch 22 is turned on or closed by the latch decision circuit 23 so that the control signal as shown in FIG. 3I is generated. In response to the control signal, the switches 10 and 11 are closed. Then, the stored data will be transferred from the temporary memories to the essential memories.

Thus, the data are simultaneously transferred from the first temporary memory 2 to the first memory 3 and from the second temporary memory 4 to the second memory 5. Accordingly, the data will be simultaneously transmitted to the luminance signal processing 12 and the chroma signal processing block 13.

What is claimed is:

1. A serial data transfer device for serially transferring data comprising:
   an input terminal to which a serial data is inputted;
   a first temporary memory for temporarily storing the serial data supplied from the input terminal;
   a first memory for storing the data supplied from the first temporary memory;
   a second temporary memory for temporarily storing the serial data supplied from the input terminal;
   a second memory for storing the data supplied from the second temporary memory;
   a first transfer state detecting circuit for generating a first control signal indicative of that the serial data supplied from the input terminal is being transferred;
   a second transfer state detecting circuit for generating a second control signal indicative of that the serial data supplied from the input terminal is being transferred;
   a control circuit for deciding that the first and the second control signal have not arrived in response to the arrival of a transfer command signal, thereby transferring the data from the first temporary memory to the first memory and transferring the data from the second temporary memory to the second memory, whereby in response to the transfer command signal, the data are simultaneously transferred to said first memory and said second memory.

2. A serial data transfer device according to claim 1, wherein
   said first transfer state detecting circuit generates a first transfer completion signal indicative of that the serial data has been transferred to said first memory;
   said second transfer state detecting circuit generates a second transfer completion signal indicative of that the serial data has been transferred to said second memory; and
   in response to the arrival of said transfer command signal, said control circuit decides that said first and second control signals do not still come and said first and second transfer completion signals have come, thereby transferring the data from the first temporary memory to the first memory and transferring the data from the second temporary memory to the second memory, whereby in response to the transfer command signal, the data are simultaneously transferred to said first memory and said second memory.

3. A serial data transfer device according to claim 1, wherein
   said control circuit comprises:
      a system control circuit for generating a control pulse and a detection pulse delayed from the control pulse in timing in accordance with a change of the state of a transfer pulse indicative of the transfer command signal;
      a latch decision circuit for deciding whether or not said first and second control signal have not arrived while said control pulse is generated by the system control circuit; and
      a switch for passing or stopping the detection pulse in accordance with a decision output signal from the latch decision circuit, thereby transferring the data from the first temporary memory to the first memory and transferring the data from the second temporary memory to the second memory, whereby in response to the transfer command signal, the data are simultaneously transferred to said first memory and said second memory.

4. A serial data transfer device according to claim 1, wherein said transfer command signal is a vertical synchronizing signal of a video signal.

5. A serial data transfer device according to claim 1, wherein said transfer command signal is an RF switch pulse signal.

6. A serial data transfer device according to claim 1, wherein said transfer command signal is a C-ROT pulse signal.

7. A serial data transfer device according to claim 1, wherein said transfer command signal is an HA switch pulse.

8. A serial data transfer device according to claim 1, wherein said transfer command signal is an RF switch pulse signal and a vertical synchronizing signal.

9. A serial data transfer device according to claim 1, wherein said transfer command signal is a horizontal synchronizing signal located in a period which does not appear on a screen.

10. A serial data transfer device for serially transferring data comprising:
    an input terminal to which a serial data is inputted;
    a first temporary memory for temporarily storing the serial data supplied from the input terminal;
    a first memory for storing the data supplied from the first temporary memory;
    a second temporary memory for temporarily storing the serial data supplied from the input terminal;
    a second memory for storing the data supplied from the second temporary memory;
    a first transfer state detecting circuit for generating a first control signal indicative of that the serial data supplied from the input terminal is being transferred;
    a second transfer state detecting circuit for generating a second control signal indicative of that the serial data supplied from the input terminal is being transferred;
    a system control circuit for generating a control pulse and a detection pulse delayed from the control pulse in timing in accordance with a change of the state of a transfer pulse indicative of the transfer command signal;
    a latch decision circuit for deciding whether or not said first and second control signal have not arrived while said control pulse is generated by the system control circuit; and
    a switch for passing or stopping the detection pulse in accordance with a decision output signal from the latch decision circuit, thereby transferring the data from the first temporary memory to the first memory and transferring the data from the second temporary memory to the second memory, whereby in response to the transfer command signal, the data are simultaneously transferred to said first memory and said second memory.

11. A serial data transfer device according to claim 10, wherein said transfer command signal is either one of a vertical synchronizing signal of a video signal, an RF switch pulse signal, a C-ROT pulse signal and an HA switch pulse, and said switch includes a first switch and a second switch.

* * * * *